United States Patent
Park et al.

(10) Patent No.: US 10,120,466 B2
(45) Date of Patent: Nov. 6, 2018

(54) PEN INPUT DEVICE HAVING MALFUNCTION PREVENTION FUNCTION AND METHOD OF PREVENTING MALFUNCTION THEREOF

(71) Applicant: SAMSUNG ELECTRONICS CO., LTD., Suwon-si, Gyeonggi-do (KR)

(72) Inventors: Gyounghwan Park, Seoul (KR); Eunseok Hong, Suwon-si (KR); Shinho Kim, Uiwang-si (KR); Wonseob Kim, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 94 days.

(21) Appl. No.: 15/244,185

(22) Filed: Aug. 23, 2016

(65) Prior Publication Data

US 2017/0097696 A1    Apr. 6, 2017

(30) Foreign Application Priority Data

Oct. 6, 2015    (KR) .................. 10-2015-0140425

(51) Int. Cl.
  *G06F 3/038*    (2013.01)
  *G06F 3/0346*   (2013.01)
  *G06F 3/0354*   (2013.01)
  *G06F 3/046*    (2006.01)

(52) U.S. Cl.
  CPC .......... *G06F 3/0383* (2013.01); *G06F 3/0346* (2013.01); *G06F 3/03545* (2013.01); *G06F 3/046* (2013.01)

(58) Field of Classification Search
  CPC .. G06F 3/0383; G06F 3/0346; G06F 3/03545; G06F 3/046
  See application file for complete search history.

(56) References Cited

U.S. PATENT DOCUMENTS

| | | | |
|---|---|---|---|
| 2003/0047360 A1* | 3/2003 | Katsurahira | G06F 3/03545 178/19.03 |
| 2014/0292696 A1* | 10/2014 | Son | G06F 3/03545 345/173 |
| 2014/0306940 A1 | 10/2014 | Fukushima et al. | |
| 2015/0091844 A1 | 4/2015 | Jeong et al. | |
| 2015/0097806 A1 | 4/2015 | Jeong et al. | |

FOREIGN PATENT DOCUMENTS

KR    10-0628359    9/2006

* cited by examiner

*Primary Examiner* — Sahlu Okebato
(74) *Attorney, Agent, or Firm* — Nixon & Vanderhye, P.C.

(57) ABSTRACT

A pen input device having malfunction prevention function and method of preventing malfunction thereof are disclosed. The pen input device includes: a housing having a bar form and having one end relatively narrowly opened to form a housing space; a resonant circuit housed within the housing; a tip that protrudes from an open end of the housing to the outside, the tip comprising a dielectric material and being configured to be movable within a predetermined range in a direction of a longitudinal axis of the housing, the tip being further configured to be self-centering; and a ground shielding portion formed in a portion of the housing in which electromagnetic induction occurs, the ground shielding portion not including the tip.

12 Claims, 6 Drawing Sheets

PEN INPUT DEVICE HAVING MALFUNCTION PREVENTION FUNCTION AND METHOD OF PREVENTING MALFUNCTION THEREOF

CROSS-REFERENCE TO RELATED APPLICATION

The present application is based on and claims priority under 35 U.S.C. § 119 to a Korean patent application filed on Oct. 6, 2015 in the Korean Intellectual Property Office and assigned Serial number 10-2015-0140425, the disclosure of which is incorporated by reference herein in its entirety.

BACKGROUND

Field

Various example embodiments relate to a pen input device having a malfunction prevention function and a method of preventing a malfunction thereof.

Description of Related Art

Nowadays, portable electronic devices provide an input and output function using a touch screen for convenience of an input and a slim trend, and for this purpose, the touch screen includes a display panel and a touch panel.

In order to provide an elaborate touch input as well as recognition of a hand touch, a mobile terminal having a touch screen supports a touch input device such as a stylus or an electronic pen. Touch technology using such a stylus pen is largely classified into an active type requiring power and a non-powered passive type, and when an electromagnetic field occurring in a digitizer pad closely meets with a metal coil attached to an end portion of a pen, an electromagnetic induction phenomenon occurs and thus a change occurs in the already formed electromagnetic field and thus the pen detects and operates the change.

The active electronic pen includes a power source such as a battery. That is, the active electronic pen drives an LC resonant circuit formed with an inductor L and a capacitor C through the power source. In this case, the mobile terminal receives a wireless signal occurring in the LC resonant circuit of the electronic pen with an array form of antenna therein and recognizes a location of the electronic pen using reception strength of each antenna.

The passive electronic pen does not include a separate power source and receives and operates power from a mobile terminal using an electromagnetic induction phenomenon. For example, the passive electronic pen using an electromagnetic induction phenomenon generally uses an electromagnetic resonant (EMR) method using an LC resonant circuit. Such an EMR method of passive electronic pen using the LC resonant circuit receives a wireless signal from the mobile terminal through the LC resonant circuit and transmits a reflection signal of the received wireless signal to the mobile terminal. In this case, the mobile terminal receives the reflection signal transmitted from the LC resonant circuit of the electronic pen with an array form of antenna therein, measures reception strength of each antenna, and recognizes a location of the electronic pen.

An EMR method of electronic pen using the LC resonant circuit provides state information such as a pen pressure and a button input through a resonant frequency change of the reflection signal. For this purpose, a conventional EMR method of electronic pen using an LC resonant circuit may include a capacitor, inductor, variable inductor, and variable capacitor for changing a resonant frequency of the LC resonant circuit according to a pen pressure or a button input.

In this way, when a conventional stylus pen approaches a touch screen, the conventional stylus pen starts to recognize this, and when the conventional stylus pen touches the screen, the screen recognizes a pen pressure and writing is performed on the screen.

However, in a state in which a pen is placed on the screen, for example, in a state in which a pen is not used, even when the pen is laterally shaken or even when the pen and the screen are horizontally disposed such that the pen almost touches with the screen, it is recognized that the pen is used and thus a pen point occurs in an intermediate portion instead of an end portion of the pen and thus there is a problem that writing malfunctions.

SUMMARY

The present disclosure has been made in view of the above problems and provides a pen input device that can prevent and/or reduce a malfunction of a stylus pen and a method of preventing and/or reducing a malfunction thereof.

In accordance with an example aspect of the present disclosure, a pen input device, comprising: a housing having a bar form and having one end relatively narrowly opened to form a housing space; a resonant circuit housed within the housing; a tip that protrudes from an open end of the housing to the outside to form a contact portion, said tip comprising a dielectric material and being configured to be movable within a predetermined range in a direction of a longitudinal axis of the housing, the tip being further configured to be self-centering; and a ground shielding portion formed in a portion of the housing in which electromagnetic induction occurs, said ground shielding portion not including the tip.

In accordance with an another example aspect of the present disclosure, a pen input device, comprising: a housing having a bar form and having one end relatively narrowly opened to form a housing space; a resonant circuit housed within the housing; a tip that protrudes from an open end of the housing to the outside and that forms a contact portion, said tip comprising a dielectric material and being configured to be movable within a predetermined range in a direction of a longitudinal axis of the housing, the tip being further configured to be self-centering; a ground shielding portion formed in a portion of the housing in which electromagnetic induction occurs, said ground shielding portion not including the tip; and a malfunction prevention circuit that closes or opens a malfunction prevention switch that selectively operates the ground shielding portion based on an orientation direction of the housing.

In accordance with a further example aspect of the present disclosure, a method of preventing a malfunction of a pen input device, the method comprising: selectively operating a ground shielding portion of a housing formed in a portion in which electromagnetic induction occurs such that a malfunction prevention circuit within the housing closes or opens a malfunction prevention switch based on whether an orientation direction of the housing of the pen input device is a horizontal or vertical direction, wherein the malfunction prevention circuit closes the malfunction prevention switch, if a direction of the housing is a horizontal direction, and the malfunction prevention circuit opens the malfunction prevention switch, if a direction of the housing is a vertical direction.

BRIEF DESCRIPTION OF THE DRAWINGS

These and other aspects and advantages of the present disclosure will be more apparent and readily understood from the following detailed description, taken in conjunction with the accompanying drawings, in which like reference numerals refer to like elements, and wherein.

DETAILED DESCRIPTION

Hereinafter, the present disclosure will be described with reference to the accompanying drawings. Although specific example embodiments are illustrated in the drawings and related detailed descriptions are discussed in the present disclosure, the present disclosure may have various modifications and several example embodiments. However, various example embodiments of the present disclosure are not limited to a specific implementation form and it should be understood that the present disclosure includes all changes and/or equivalents and substitutes included in the spirit and scope of various example embodiments of the present disclosure. In connection with descriptions of the drawings, similar components are designated by the same reference numeral.

In various example embodiments of the present disclosure, the expression "or" or "at least one of A or/and B" includes any or all of combinations of words listed together. For example, the expression "A or B" or "at least A or/and B" may include A, may include B, or may include both A and B.

The expression "1", "2", "first", or "second" used in various embodiments of the present disclosure may modify various components of the various embodiments but does not limit the corresponding components. For example, the above expressions do not limit the sequence and/or importance of the components. The expressions may be used for distinguishing one component from other components. For example, a first user device and a second user device indicate different user devices although both of them are user devices. For example, without departing from the scope of the present disclosure, a first structural element may be referred to as a second structural element. Similarly, the second structural element also may be referred to as the first structural element.

The expression "configured to" uses in the present disclosure may be replaced, according to situations, with "suitable for", "having the capacity to", "designed to", "adapted to", "made to", or "capable of". The term "configured to" may not always mean "specially designed to". In some situations, "device configured to" may mean that the device can "do something" with other devices or components. For example, a context "processor configured to execute A, B, and C" may mean a dedicated processor (for example, embedded processor) for executing a corresponding operation, or a generic-purpose processor (for example, CPU or application processor) capable of executing corresponding operations by using at least one software program stored in a memory device.

The terms used in the present disclosure merely describe a specific embodiment, and is not intended to limit the scope of other embodiments. A singular form may include a plural form. All the terms including a technical or scientific term form may have the same meaning as terms generally understood by those skilled in the prior art. The terms defined in a general dictionary may be interpreted as having the same or similar meaning in a context of related technology, and are not interpreted abnormally or excessively unless clearly defined in the present disclosure. According to situations, the terms defined in the present disclosure cannot be interpreted as excluding the embodiments of the present disclosure.

Hereinafter, an electronic device according to various embodiments of the present disclosure will be described with reference to the accompanying drawings. The term "user" used in various embodiments may refer to a person who uses an electronic device or a device (for example, an artificial intelligence electronic device) which uses an electronic device.

Figure 1:
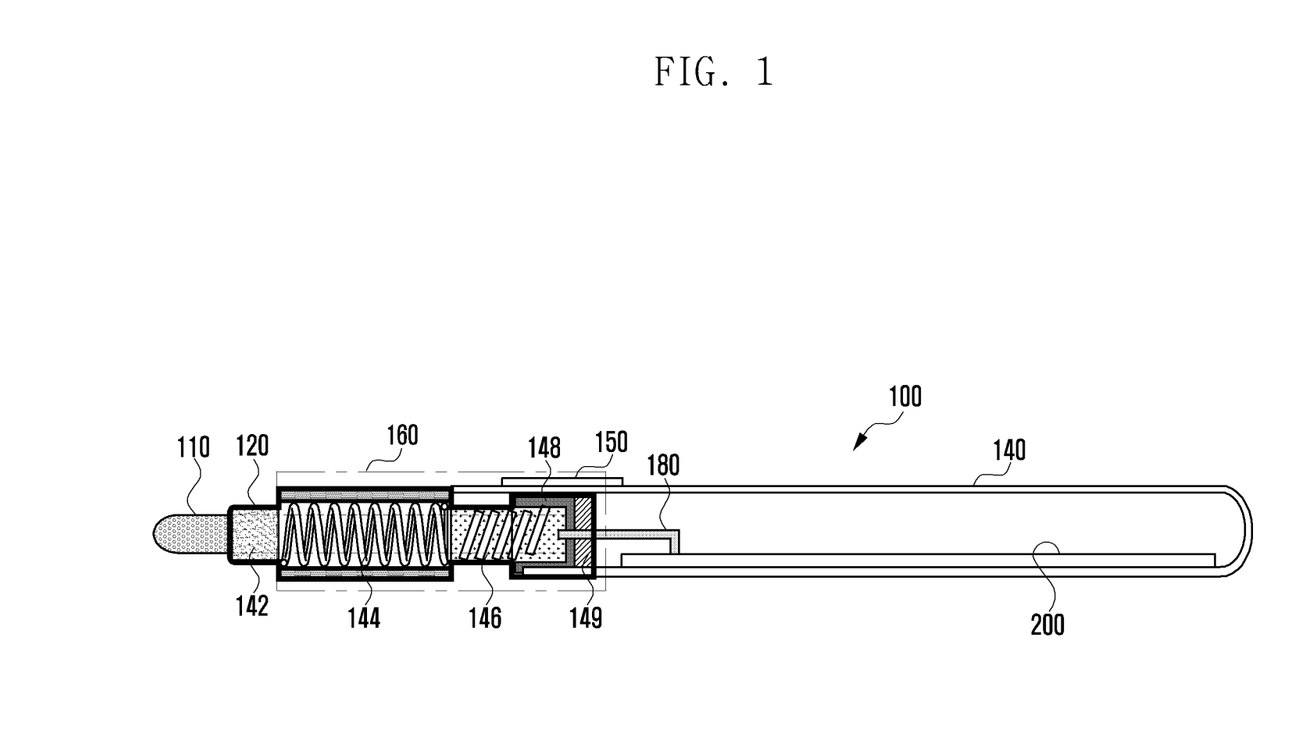
FIG. 1 is a cross-sectional diagram illustrating an example configuration of a pen input device according to various example embodiments.
Figure 2:
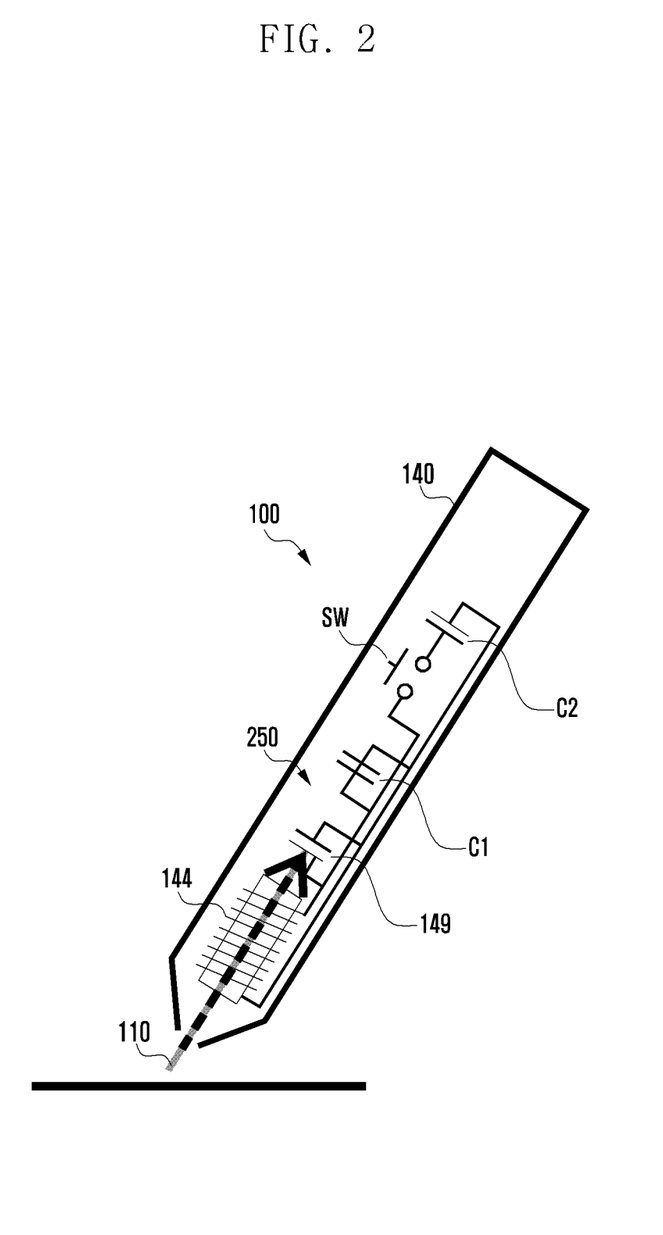
FIG. 2 is a schematic diagram illustrating an example configuration and operation of a resonant circuit portion mounted in a housing of FIG. 1.

FIG. 1 is a diagram illustrating a configuration of a pen input device according to various example embodiments, and FIG. 2 is a diagram illustrating a configuration of a resonant circuit portion mounted in a housing space of a housing of FIG. 1.

Referring to FIG. 1, a pen input device 100 according to various example embodiments is an electromagnetic induction stylus pen having a conductive tip 110 and includes a housing 140 having one end relatively narrowly opened and that forms a housing space that houses a nib 120 therein.

The conductive tip 110 protrudes from opened one side of the housing 140 to the outside, may move by a predetermined range to a housing space of a lengthwise direction of the other side facing at one side of the housing 140, and may perform self-centering. Here, self-centering may refer, for example to automatically return to an original location when an object is changed.

The conductive tip 110 may be made of a dielectric material formed with conductive rubber or a metal material or the conductive tip 110 may be formed with a method in which a dielectric material is mounted, attached, bonded, or fusion-bonded in a plastic tip to enclose the plastic tip. For example, the conductive tip 110 may be bonded to a plastic tip by a double-sided tape or an adhesive to enclose the plastic tip.

The housing 140 may include a ferrite core 142, a coil 144, an elastic body 146, a support 148, and a variable capacitor (VC) 149 of the electromagnetic induction portion, a printed circuit board 200, and a channel 180 of a single antenna formed with a conductive wire of a conductive fiber that connects a contact portion of the conductive tip 110 and a grip portion of the housing 140.

Further, the housing 140 may further include a pressing button key 150 and a ground shielding portion 160 that encloses the coil 144 of the electromagnetic induction portion, except for the conductive tip 110 in which writing is performed, and the pressing button key 150 may be generally located at a grip portion of the housing 140 in which a user holds the pen input device 100.

The elastic body 146 may be mounted to perform a function corresponding to a movement of the conductive tip 110 and may include, for example a spring that can move by a length corresponding to a distance in which the conductive tip 110 moves to a housing space of the housing 140 when the pen input device 100 performs an input (e.g., a touch input event and a drag input event in a display).

Referring to FIG. 2, at a housing space of the housing 140, a resonant circuit portion 250 may be mounted.

The mounted resonant circuit portion 250 illustrates an equivalent circuit, may include a coil 144 of an electromagnetic induction portion for an electromagnetic induction resonant operation, a variable capacitor (VC) 149, capacitors C1 and C2, and a switch (SW), and does not require power.

The coil 144 is an inductor coil, the capacitor C1 is main capacitance of the resonant circuit portion 250, and the VC 149 changes capacitance according to a pen pressure of the pen input device 100, i.e., a pressure applied to the tip 110 and thus a resonant frequency changes, thereby transferring a pen pressure to the terminal in an arrow direction.

The SW is the pressing button key 150 of the pen input device 100, and when pressing the pressing button key 150, the SW is connected to the capacitor C2 and thus a resonant frequency changes, thereby transferring a button pressure to the terminal.

The resonant circuit portion 250 may include an element in which impedance changes according to a pressure applied upon writing.

A resonant frequency of the pen input device 100 changes according to an impedance change, and an electromagnetic induction frequency of the pen input device 100 changes and thus a frequency of a magnetic signal that returns again to the digitizer may be changed.

Thereby, the digitizer may detect a pen pressure. In an impedance change element, inductance may be changed or the VC 149 may be changed.

As the electromagnetic induction portion of the pen input device 100 and a portion of a conductive fiber are mounted within the ferrite core 142 or penetrate the ferrite core 142, the electromagnetic induction portion of the pen input device 100 and the portion of a conductive fiber are electrically isolated from the electromagnetic induction coil 144 mounted at the outside of the ferrite core 142, thereby minimizing interference.

Further, the single antenna channel 180 of the conductive fiber may be connected to the printed circuit board 200 of the pen input device 100. Thereby, by increasing capacitance, enough electrical coupling of a level that can recognize a coordinate with a capacitive touch screen panel may occur.

In this way, the pen input device 100 has a form of an electromagnetic induction stylus pen, and a terminal thereof is an active type and a pen thereof is a passive type and thus an input through an electromagnetic induction reaction using the terminal and the electromagnetic induction portion of the pen may be executed.

That is, in the resonant circuit portion 250 of the pen input device 100 according to various example embodiments, as the inductor coil 144 and the capacitors C1 and C2 are connected in parallel, when the pen input device 100 approaches the touch screen device, an electromagnetic induction phenomenon occurs.

Accordingly, in the digitizer of the terminal, an electromagnetic (EM) field generates, the generated EM field is received in the resonant circuit portion 250 of the pen input device 100 and thus a current occurs. A magnetic field may be formed with a current generated in the pen input device 100.

The digitizer of the terminal may scan the magnetic field to determine a coordinate of the pen input device 100 with a strength difference of a signal.

Figure 3:
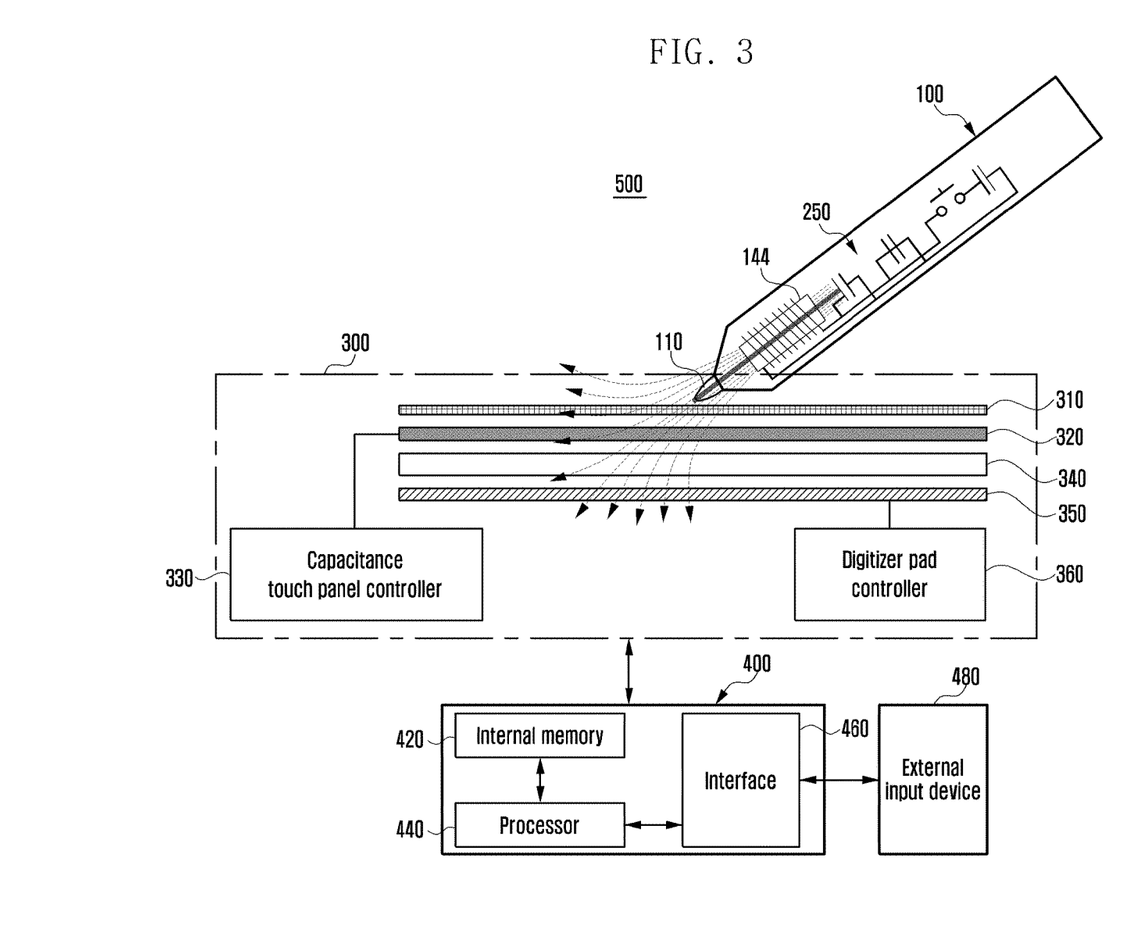
FIG. 3 is a diagram illustrating an example configuration of an electronic device using the pen input device of FIG. 1.

FIG. 3 is a diagram illustrating an example configuration of an electronic device 500 using the pen input device of FIG. 1.

The electronic device 500 according to various example embodiments of the present disclosure may be a device using the pen input device 100. For example, the electronic device may be one or a combination of a smart phone, a tablet Personal Computer (PC), a mobile phone, a video phone, an e-book reader, a desktop PC, a laptop PC, a netbook computer, a Personal Digital Assistant (PDA), a camera, a wearable device (for example, a Head-Mounted-Device (HMD) such as electronic glasses, electronic clothes, and electronic bracelet, an electronic necklace, an electronic appcessary, an electronic tattoo, and a smart watch, or the like, but is not limited thereto.

According to some example embodiments, the electronic device may be a smart home appliance having a projection function. The smart home appliance may include at least one of a TeleVision (TV), a Digital Video Disk (DVD) player, an audio player, an air conditioner, a cleaner, an oven, a microwave oven, a washing machine, an air cleaner, a set-top box, a TV box (for example, Samsung HomeSync™, Apple TV™, or Google TV™), game consoles, an electronic dictionary, an electronic key, a camcorder, and an electronic frame, or the like, but is not limited thereto.

According to some example embodiments, the electronic device may include at least one of various types of medical devices (for example, Magnetic Resonance Angiography (MRA), Magnetic Resonance Imaging (MRI), Computed Tomography (CT), a scanner, an ultrasonic device and the like), a navigation device, a Global Positioning System (GPS) receiver, an Event Data Recorder (EDR), a Flight Data Recorder (FDR), a vehicle infotainment device, electronic equipment for a ship (for example, a navigation device for ship, a gyro compass and the like), avionics, a security device, a head unit for a vehicle, an industrial or home robot, an Automatic Teller Machine (ATM) of financial institutions, and a Point Of Sale (POS) device of shops, or the like, but is not limited thereto.

According to some example embodiments, the electronic device may include at least one of furniture or a part of a building/structure, an electronic board, an electronic signature receiving device, a projector, and various types of measuring devices (for example, a water meter, an electricity meter, a gas meter, a radio wave meter and the like) including a projection function, or the like, but is not limited thereto. The electronic device according to various example embodiments of the present disclosure may be one or a combination of the above described various devices. Further, the electronic device according to various embodiments of the present disclosure may be a flexible device. It is apparent to those skilled in the art that the electronic device according to various example embodiments of the present disclosure is not limited to the above described devices.

According to various example embodiments, the electronic device may be any or a combination of the aforementioned various devices. In an embodiment, the electronic device may be a flexible electronic device. The electronic device is not limited to the aforementioned devices but may be any devices emerging newly in the future in line with the advance of technologies.

The electronic device having a waterproof structure for a display module according to various example embodiments may include a short range communication module for short range communication. As short range communication technique, Bluetooth, radio frequency identification (RFID), infrared data association (IrDA), ultra wideband (UWB), ZigBee, near field communication (NFC), or the like may be used.

Therefore, the pen input device 100 may be connected to the electronic device 500 wirelessy by, for example, using Bluetooth technology.

Referring to FIG. 3, the electronic device 500 according to various example embodiments may include a pen input device 100 of the above-described electromagnetic induction stylus pen, touch screen device 300, and host device 400.

The touch screen device 300 provides an input and output interface between the electronic device 500 and a user to simultaneously perform an input and output function of data and to transfer a user's touch input detected by applying touch detection technology to the host device 400, and may show visual sense information, for example text, graphic, and video provided from the host device 400 to the user.

The touch screen device 300 may include a configuration in which the screen window 310, capacitance touch panel 320, capacitance touch panel controller 330, display panel 340, digitizer pad 350, and digitizer pad controller 360 are sequentially layered.

The screen window 310 may be an area in which an external input, for example a touch input by the external pen input device 100 occurs and in which a conductor (e.g., a touch input by a finger and palm of a human body) contacts. For example, the screen window 310 may be glass processed with reinforced coating or oleophobic coating and may be formed using at least one of alumina, silica, and sapphire materials.

According to an example embodiment, the screen window 310 may be made of a transparent material and may be attached to the capacitance touch panel 320 using an adhesive or may be fixed to a body that forms an external appearance of the electronic device 500.

As an adhesive, a super view resin or an optically clear adhesive may be used.

In the capacitance touch panel 320, electrode lines including a plurality of electrodes are alternately formed in parallel, and the capacitance touch panel 320 receives a voltage from the capacitance touch panel controller 330 to form an electric field for touch detection.

The touch screen device 300 detects a touch location of a tip 110 of the pen input device 100 as a final input coordinate through a capacitance change from the capacitance touch panel 320.

The capacitance touch panel controller 330 may control to supply a voltage to the capacitance touch panel 320 layered at one side of the screen window 310.

According to an example embodiment, in the capacitance touch panel controller 330, as the conductive tip 110 mounted at one side of the pen input device 100 approaches a threshold distance value from the screen window 310, a reception electrode (not shown) of the capacitance touch panel 320 may acquire an electric charge amount changing according to approach or contact of the pen input device 100 or an object (e.g., a finger of a human body) having conductivity to the screen window 310.

The capacitance touch panel controller 330 provides a location in which the conductive tip 110 of the pen input device 100 detects based on an electric charge amount acquired in the reception electrode to the host device 400, and a processor 440 of the host device 400 may perform operation corresponding thereto. That is, the capacitance touch panel controller 330 controls the display panel 340 to display a user interface.

Further, the capacitance touch panel controller 330 may provide coordinate information including information on whether a stylus is a passive stylus.

The digitizer pad 350 may include a Flexible Printed Circuit Board (FPCB) including a plurality of loop antenna coils overlapped in an X-axis and Y-axis arrangement direction, provide an AC current to the digitizer pad controller 360, and generate an electromagnetic field.

Further, at a rear surface of the digitizer pad 350, a shield plate for shielding noise may be included.

The digitizer panel controller 360 may provide a pen pressure and coordinate information of the pen input device 100.

When the pen input device 100 contacts or approaches an electromagnetic field of the digitizer pad 350, the resonant circuit portion 250 of the pen input device 100 generates a current, and a magnetic field may be formed in the resonant circuit portion 250 by the current.

The digitizer pad controller 360 scans strength of a magnetic field applied from the pen input device 100 to the digitizer pad 350 over an entire area, detects a location thereof, provides a detection location thereof as a recognition coordinate to the host device 400, and the processor 440 of the host device 400 outputs operation thereof, for example image information such as text, graphic, and video to the display panel 340.

The display panel 340 outputs a screen generated using coordinate information, a pen pressure of the pen input device 100, a tilt angle, and a tilt direction.

The host device 400 may include an internal memory 420, at least one processor 440, and an interface 460, and each constituent element may be a separate constituent element and may be formed with at least one integrated circuit.

The internal memory 420 may include a conversion table for correcting a coordinate.

By executing several software programs, the processor 440 may perform a processing and control for voice, image, and data communication of the electronic device 500. Further, by executing a specific software module (instruction set) stored at the internal memory 420 and/or an external memory (not shown), the processor 440 may perform a method of an example embodiment.

The interface 460 may connect an external input device 480 of the electronic device 500 and the host device 400. The external input device 480 may include, for example an external memory, camera device, sensor device, wireless communication device, audio device, and external port device.

According to the electronic device 500, a touch location of the tip 110 detected by the capacitance touch panel controller 330 is used as an input coordinate, and coordinate information that uses a location detected by the digitizer pad controller 360 as a recognition coordinate is provided to the host device 400, and thus the host device 400 may generate tilt information using such coordinate information and perform coordinate correction using a conversion table included in the internal memory 420.

Figure 4:
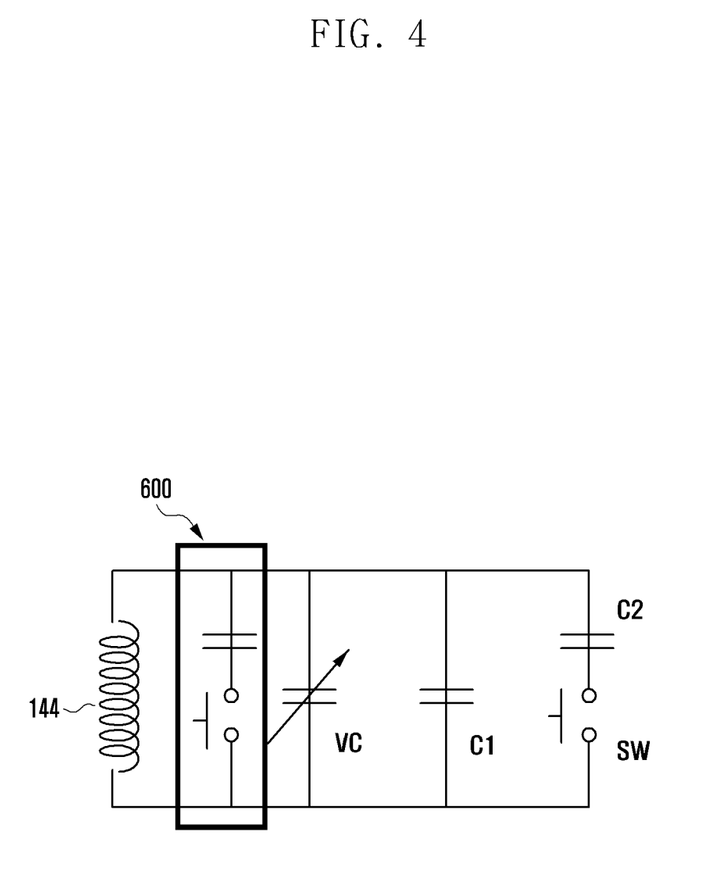
FIG. 4 is a circuit diagram illustrating an example resonant circuit of the resonant circuit portion of FIG. 2.

FIG. 4 is a circuit diagram illustrating an example resonant circuit of the resonant circuit portion of FIG. 2.

Referring to FIG. 4, as the resonant circuit portion 250 of the pen input device 100 according to various example embodiments connects the inductor coil 144 and capacitors C1 and C2 in parallel, when the pen input device 100 approaches the touch screen device, an electromagnetic induction phenomenon occurs. In this case, in a state in which the pen is put on the screen, for example, in a state in which the pen is not used, when the pen is laterally shaken or when the pen and the screen are horizontally disposed such that the pen almost touches with the screen, it may be recognized that the pen is used by erroneously sensing a value of the VC 149 and thus a pen point occurs in an intermediate portion instead of an end portion of the pen and writing may malfunction, and in order to prevent this and/or reduce the chances of this occurring, the malfunction prevention switch 600 may be additionally included in parallel between the inductor coil 144 and the VC 149.

When using a pen input device according to various example embodiments, by turning on/off the malfunction prevention switch 600, when the pen is horizontally located on the screen, by selectively operating, in the circuit, the ground shielding portion 160 (as illustrated in FIG. 1) that encloses the coil 144 of the electromagnetic induction portion, except for the conductive tip 110 in which writing is performed, when the pen is horizontally placed on the screen, a malfunction in which writing is performed can be prevented and/or reduced.

That is, when the malfunction prevention switch 600 is turned on, even if the pen input device 100 is horizontally placed on the screen, recognition of an electromagnetic field by an electromagnetic induction phenomenon is blocked by the ground shielding portion 160 and thus a malfunction of the pen input device 100 can be prevented and/or reduced.

Figure 5:
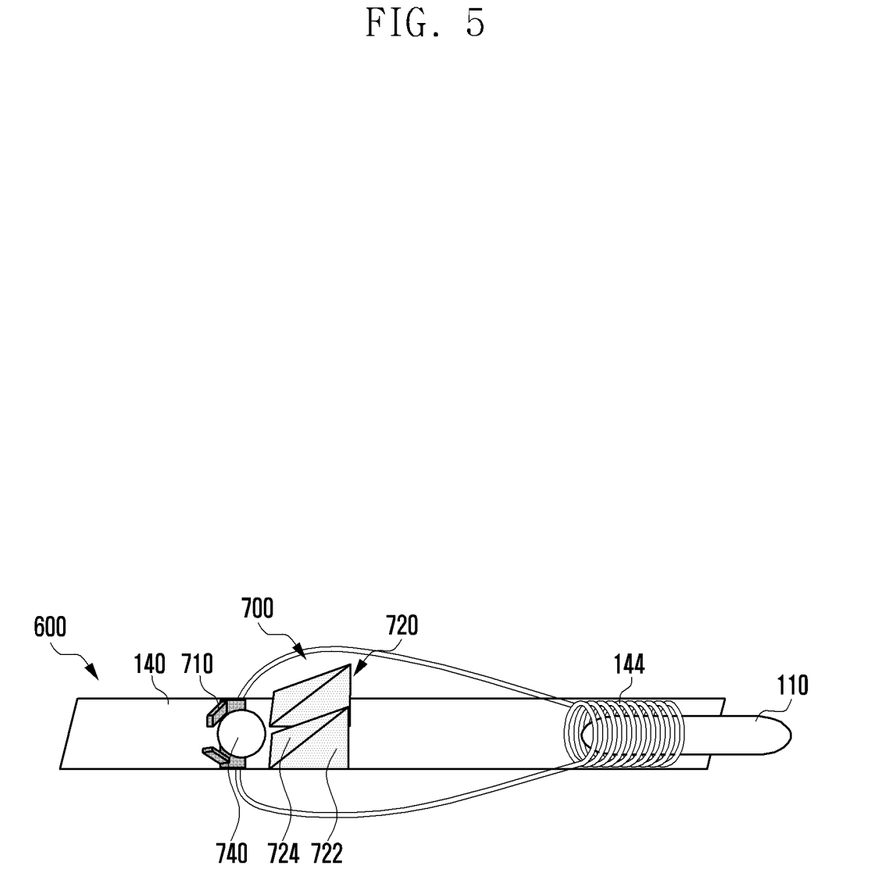
FIG. 5 is a diagram illustrating an example short-circuit configuration of a malfunction prevention portion of a pen input device according to various example embodiments.
Figure 6:
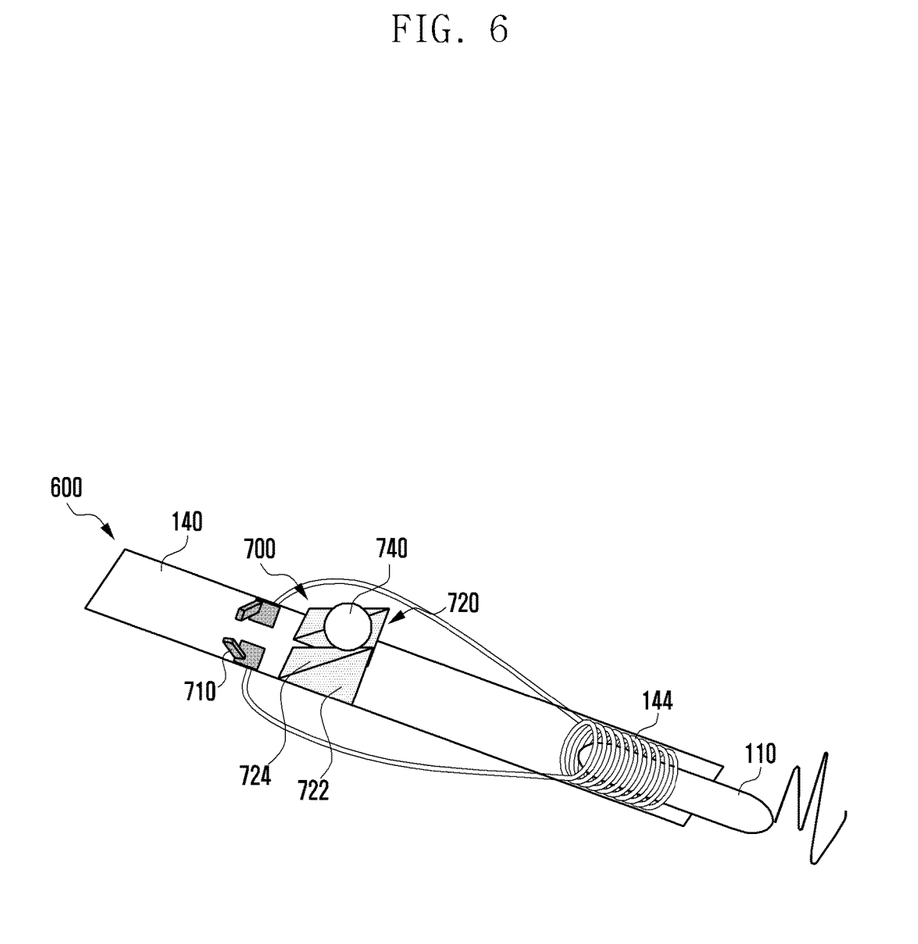
FIG. 6 is a diagram illustrating an open configuration of a malfunction prevention portion of a pen input device according to various example embodiments.

FIGS. 5 and 6 are diagrams illustrating examples of short-circuit and open configurations of a malfunction prevention portion or circuit of a pen input device according to various example embodiments.

Referring to FIGS. 5 and 6, a malfunction prevention portion 700 of the pen input device 100 according to various example embodiments may include a pair of electrodes 710 connected to the inductor coil 144 and formed at one side of the housing 140, a tilt guide 720 separated by a predetermined distance from the electrode 710 to be formed within the housing 140, and a moving member 740 that slides or moves between the electrode 710 and the tilt guide portion 720 based on a direction of the housing 140.

For easy sliding or moving, the moving member 740 may, for example, and without limitation, be a ball or bead form of conductive member. According to an example embodiment, the moving member 740 may, for example, be a metal bead.

The tilt guide portion 720 may, for example, be a separated pair of triangular members 722 and each moving member 740 has a same inclined surface 724 such that the moving member 740 is guided by a self-load therebetween to vertically move, and a tilt of the inclined surface 724 may increase toward the conductive tip 110.

When the pen input device 100 is horizontally placed on the screen, the moving member 740 contacts the electrode 710, as illustrated in FIG. 5 and thus the malfunction prevention switch 600 may be closed or short-circuited. Accordingly, recognition is not normally performed and writing is not performed.

Alternatively, for writing, when the user holds the pen input device 100, e.g., when the pen input device 100 becomes substantially vertical, the moving member 740 is guided between the triangular members 722 to be slid toward the conductive tip 110 and to be separated from a contact with the electrode 710 and is thus located at the triangular member 722, as illustrated in FIG. 6. Accordingly, the pen input device 100 is normally recognized and writing may be performed.

As described above, in a pen input device according to various example embodiments, by selectively operating, in a circuit, a ground shielding portion that encloses a coil of the electromagnetic induction portion, except for a conductive tip by the malfunction prevention switch 600, a malfunction of the pen input device can be prevented and/or reduced in the circuit, and by short-circuiting (e.g., closing) or opening an electrode by the switch of the malfunction prevention portion 700, a malfunction of the pen input device can be structurally prevented and/or reduced.

Further, in a pen input device according to various example embodiments, in a portion in which electromagnetic induction occurs, except for a pen front end portion in which writing is performed, by forming a ground shielding portion, a pen point does not occur, and by adapting a simple configuration of short-circuit circuit and structure, a malfunction of the pen input device can be prevented and/or reduced with a cheap cost.

The example embodiments disclosed in the specification and drawings are merely presented to easily describe technical contents of the present disclosure and to aid in the understanding of the present disclosure and are not intended to limit the scope of the present disclosure. Therefore, all changes or modifications derived from the technical idea of the present disclosure as well as the example embodiments described herein should be interpreted as belonging to the scope of the present disclosure.

What is claimed is:

1. A pen input device, comprising:
 a housing having a bar form and having one end relatively narrowly opened to form a housing space;
 a resonant circuit housed within the housing;
 a tip that protrudes from an open end of the housing to the outside to form a contact portion to which a pressure is applied, said tip comprising a dielectric material and being configured to be movable within a predetermined range in a direction of a longitudinal axis of the housing, the tip being further configured to be self-centering;
 a ground shielding portion disposed in a portion of the housing in which electromagnetic induction occurs, said ground shielding portion not including the tips;
 wherein the housing further comprises a malfunction prevention portion comprising a malfunction prevention switch and an actuator configured to selectively actuate the malfunction prevention switch based on an orientation of the housing, and
 wherein the malfunction prevention switch of the malfunction prevention portion comprises a pair of electrodes connected to the portion of the housing in which the electromagnetic induction occurs and is disposed at a side of the housing, the actuator of the malfunction prevention portion comprising a tilt guide formed within the housing and separated by a predetermined distance from the pair of electrodes, and a moving member configured to move between the electrode and the tilt guide based on an orientation direction of the housing.

2. The pen input device of claim 1, wherein the resonant circuit is an equivalent circuit comprising an inductor coil of an electromagnetic induction portion that provides an electromagnetic induction resonant operation, a variable capacitor (VC), first and second capacitors, a switch SW, and a malfunction prevention switch.

3. The pen input device of claim 2, wherein the malfunction prevention switch is provided in parallel between the inductor coil and the VC and selectively engages the ground shielding portion.

4. The pen input device of claim 1, wherein the housing comprises a ferrite core, a coil in which the electromagnetic induction occurs, a channel of a single antenna comprising a conductive wire that connects a contact portion and grip portion of the tip, and a printed circuit board connected to the channel.

5. The pen input device of claim 4, wherein the grip portion of the housing comprises a button key configured to be connected to a second capacitor of the resonant circuit when the button key is depressed, wherein a resonant frequency of the resonant circuit is changed by depression of the button.

6. The pen input device of claim 1, wherein the moving member includes a ball or bead comprising a conductive material and configured to move between the tilt guide and the electrodes.

7. The pen input device of claim 1, wherein the tilt guide comprises a separated pair of triangular members each having an inclined surface with substantially the same incline, wherein the tilt guide is configured to guide the moving member to move in a substantially vertical direction.

8. The pen input device of claim 7, wherein a tilt of the inclined surface increases toward the conductive tip.

9. A pen input device, comprising:
    a housing having a bar form and having one end relatively narrowly opened to form a housing space;
    a resonant circuit disposed within the housing;
    a tip that protrudes from an open end of the housing to the outside, said tip comprising a dielectric material and being configured to be movable within a predetermined range in a direction of a longitudinal axis of the housing, the tip being further configured to be self-centering;
    a ground shielding portion disposed in a portion of the housing in which electromagnetic induction occurs, said ground shielding portion not including the tip; and
    a malfunction prevention portion comprising a malfunction prevention switch and actuator, said malfunction prevention portion configured to selectively open and close the malfunction prevention switch based on an orientation direction of the housing, wherein the ground shielding portion is engaged when the malfunction prevention switch is closed;
    wherein the malfunction prevention switch comprises a pair of electrodes connected to the portion of the housing in which the electromagnetic induction occurs and is disposed at one end of the housing, the actuator comprises a tilt guide portion formed within the housing separated from the pair of electrodes by a predetermined distance, and a moving member moves between the electrodes and the tilt guide portion based on an orientation direction of the housing.

10. The pen input device of claim 9, wherein the moving member is configured to contact the electrode when the housing is in a substantially horizontal state, thereby closing the malfunction prevention switch and causing the electromagnetic induction of the resonant circuit to not be recognized.

11. The pen input device of claim 9, wherein the moving member and the electrode are configured to be separated when the housing is oriented in a substantially vertical orientation, and the malfunction prevention switch is opened causing the electromagnetic induction of the resonant circuit to be recognized.

12. A method of preventing a malfunction of a pen input device, the method comprising:
    selectively operating a ground shielding portion of a housing formed in a portion in which electromagnetic induction occurs such that a malfunction prevention portion within the housing closes or opens a malfunction prevention switch based on an orientation direction of the housing of the pen input device of claim 1,
    closing the malfunction prevention switch of the malfunction prevention portion, if an orientation direction of the housing is a substantially horizontal direction, the malfunction prevention switch, and
    opening the malfunction prevention switch of the malfunction prevention portion, if the orientation direction of the housing is a substantially vertical direction.

* * * * *